Figure 1:
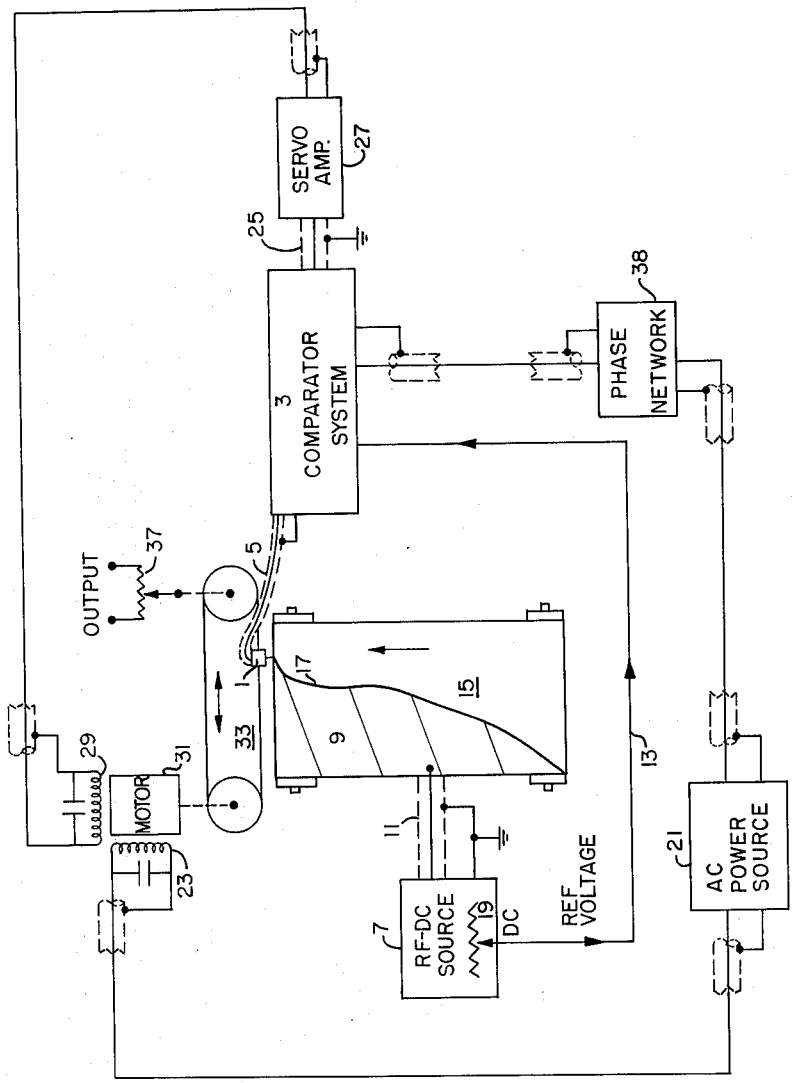

Sept. 21, 1965   J. P. WOODS ETAL   3,207,964
AUTOMATIC CURVE FOLLOWING SYSTEM
Filed Jan. 31, 1962   3 Sheets-Sheet 1

INVENTORS.
John P. Woods,
Tom Prickett, Jr.
BY Charles F. Steininger
ATTORNEY.

Sept. 21, 1965        J. P. WOODS ETAL        3,207,964
             AUTOMATIC CURVE FOLLOWING SYSTEM
Filed Jan. 31, 1962                           3 Sheets-Sheet 3

INVENTORS.
John P. Woods.
Tom Prickett, Jr.
BY Charles F. Steininger
ATTORNEY.

United States Patent Office 3,207,964
Patented Sept. 21, 1965

3,207,964
AUTOMATIC CURVE FOLLOWING SYSTEM
John P. Woods, Dallas, and Tom Prickett, Jr., Richardson, Tex., assignors to The Atlantic Refining Company, Philadelphia, Pa., a corporation of Pennsylvania
Filed Jan. 31, 1962, Ser. No. 170,071
14 Claims. (Cl. 318—31)

This invention relates to an improved curve following system. More particularly, this invention relates to an improved method and apparatus for following an electrically conductive body by comparing voltage induced in an electrostatic pickup with a predetermined D.C. voltage.

In the past, various types of electrical systems have been used to guide a pickup over a conductive trace and to produce an electrical signal representing a function of the trace. Generally, these systems can be broken down into two groups. The first group develops an error voltage by using the pickup or stylus to at least intermittently physically contact the trace. The second group does not contact the trace but develops an error voltage by electrical induction.

One of the most serious disadvantages of the first group results from the physical wear and friction developed by the stylus contacting the trace and its non-conductive support. The resulting contact tends to remove or at least distort the conductive trace so that continued operation actually changes the trace and the function generated therefrom.

A serious disadvantage inherent in the second group and found in most of the first group is the requirement that both sides of the conductive trace accurately represent the mathematical expression of which the electrical signal is to be a function. Of course, this requirement makes the construction of the conductive trace more difficult.

Both groups of prior art systems are subject to servo-hunting and suffer from lack of flexibility and maximum positive control. The first group especially suffers from the hunting effect since it relies on making and breaking contact with the conductive trace to develop its error signal. The second group suffers less from servohunting but exercises only very limited positive control. Positive control can be defined as the ability of a system to return its pickup or stylus to the proper tracking position when it has been displaced. Therefore, when the induction type pickup used by the second group is accidentally knocked or moved away from the immediate vicinity of the conductive trace there is no induced voltage and the system does not develop a correction signal to return the pickup to its correct position.

Accordingly, an object of this invention is to provide an improved method and apparatus for automatically tracking an electrical body with a simplified system displaying improved operational characteristics.

Another object of this invention is to provide an improved method and apparatus for automatically tracking an electrically conductive body wherein maximum flexibility is afforded and correction signals developed by the system cannot be confused by the servo.

Another object of this invention is to provide an improved inductive type curve following method and apparatus that exhibits maximum positive control.

Another object of this invention is to provide an improved method and apparatus for automatically tracking an electrically conductive body without disturbing or distorting the body.

Another object of this invention is to provide an improved method and apparatus for tracking an electrically conductive body whereby the construction of the body is simplified by the requirement that only one edge of the body represents the curve to be translated into an output voltage.

Another object of this invention is to provide an improved method and apparatus for automatically tracking one edge of the electrically conductive body with a capacitive pickup.

Another object of this invention is to provide an improved method and apparatus for tracking one edge of a conductive body by comparing the voltage induced in the pickup with a D.C. voltage representative of the induced voltage when the pickup is positioned over the edge of the conductive body.

Another object of this invention is to provide an improved method and apparatus for automatically tracking an electrically conductive body whereby hunting can be reduced to a minimum by adjusting the pickup's air gap distance, shield dimensions, or both.

Figure 2:
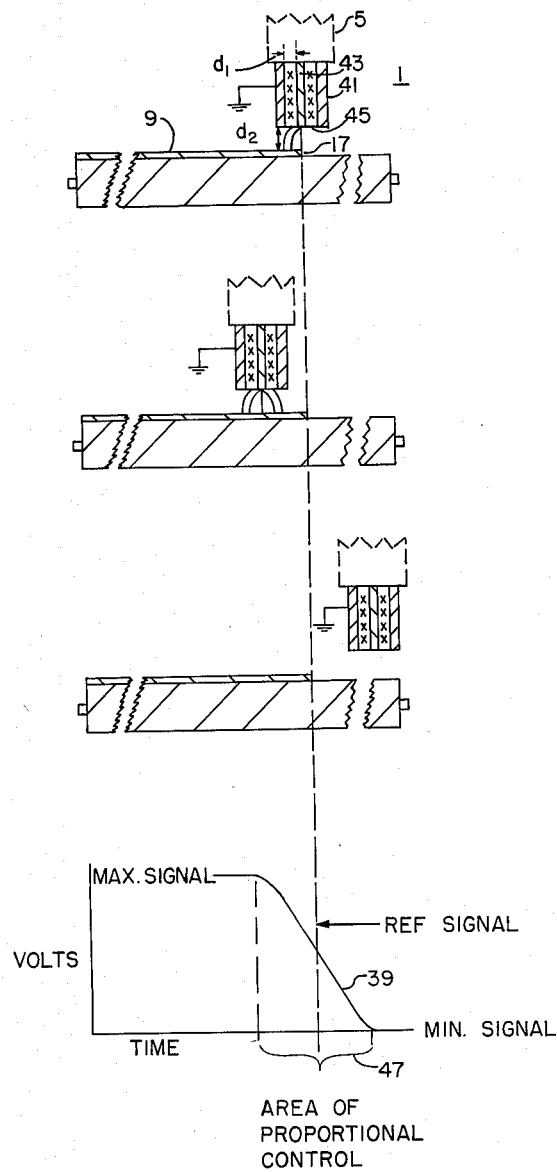
Figure 3:
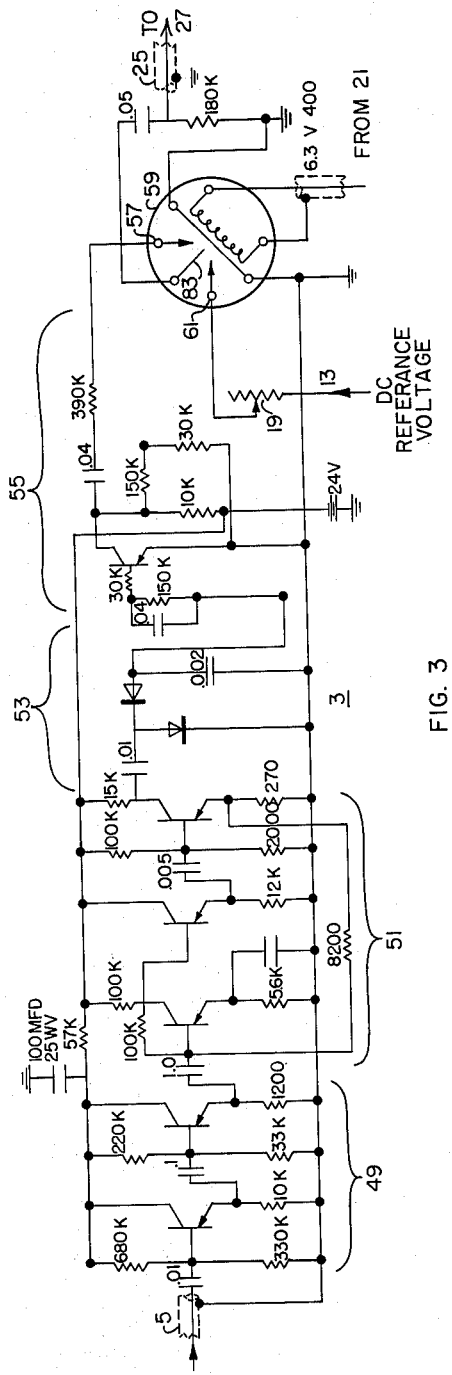
Figure 4:
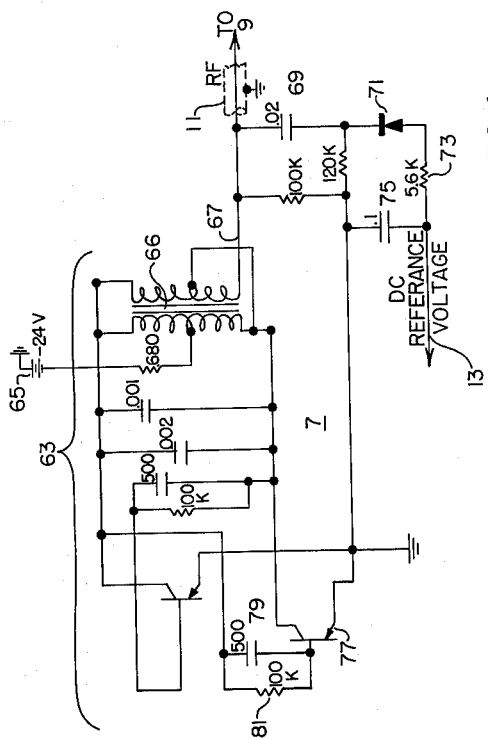

These and other objects and advantages of the present invention will be apparent from the following detailed description when read in conjunction with the accompanying drawings wherein:

FIGURE 1 shows a block diagram of the curve follower.
FIGURE 2 shows a cross section of a capacitive pickup in three typical operating positions.
FIGURE 3 shows a circuit diagram of the preferred embodiment of the comparator means.
FIGURE 4 shows a circuit diagram of the preferred embodiment of the R.F.-D.C. voltage source.

Briefly described, the present invention includes an improved method and apparatus for developing an error voltage for a servosystem adapted to move a capacitive-type pickup above a predetermined edge of a conductive curve mounted on a non-conductive support. The improved method includes the steps of:

(a) Applying a predetermined R.F. potential to the curve,
(b) Inducing a portion of the R.F. voltage into the pickup by positioning the pickup over the edge of the curve,
(c) Developing a D.C. reference voltage which is a function of the R.F. voltage,
(d) Rectifying the induced R.F. voltage, and
(e) Comparing the rectified induced R.F. voltage with the D.C. reference voltage by periodically sampling each of the compared voltages at a predetermined frequency whereby the sampled voltages are combined to produce an A.C. signal whose amplitude is indicative of the pickup's displacement from the predetermined edge and whose phase relation with the sampling frequency is indicative of the direction of pickup displacement.

The improved method of operation can be carried out by the novel combination of a single capacitive-type pickup adapted to track the edge of a conductive curve, a comparator circuit and a R.F.-D.C. voltage source all used in conjunction with a conventional closed loop servosystem.

The advantages accruing from the improved method and apparatus are numerous and significant. The invention provides a simplified and highly accurate system for following a predetermined edge of a conductive body with maximum positive control. Regardless of the amount of pickup displacement, the proper control signal returns the pickup to the predetermined edge. The area of proportional control, which governs the amount of servo-hunt, can be accurately controlled by varying the size of the pickup, by varying the air gap between the pickup and the edge of the conductive body, or by varying both.

In addition to the above-described advantages, the invention simplifies the construction of curves to be followed. By tracking above one edge of the conductive body, the desired curve can be cut or formed at the edge of a sheet of tinfoil, a wide band of burglar alarm tape, etc., without the necessity of forming a second curve parallel to the first. If a narrow strip of oil or burglar alarm tape is used the curve can be sketched on the drum or other record transport means and one side of the tape pressed onto the drum to conform to the curve. This operation distorts the second edge of the tape so only the edge following the curve can be used. Since the subject system follows a single edge and induces a voltage in the pickup without physically contacting the conductive body, it is capable of working with any type of easily applied conductive material without distorting the edge forming the curve. The above-described conductive bodies are superior to curves made with conductive paint, ink, pencil, etc., since these materials tend to feather when applied to a record medium and the resulting feathered edges cause excessive hunt or jitter, regardless of the curve following system used.

Refer now to FIGURE 1 showing the invention in block diagram form. Single capacitive pickup 1 is connected to comparator 3 by shielded cable 5. R.F.-D.C. voltage source 7 is connected to conductive body 9 by shielded cable 11 and to comparator 3 by line 13. Conductive body 9 is mounted on transport 15 moving in the direction indicated. Pickup 1 is positioned to ride over edge 17 of conductive body 9. The remaining portion of the block diagram is a conventional closed loop servo capable of using the basic circuit components as indicated in the drawing and as will be described in detail hereinafter. Closed loop servosystems are discussed in Servomechanisms and Regulating System Design, volume I, by Chestnut and Mayer, pages 6–16.

For a broad understanding of the invention the operation of the over-all device as shown in FIGURE 1 will be described first. This will be followed by a detailed description of the novel pickup, comparator and R.F.-D.C. voltage source and their novel use in producing an improved method of determining an error signal.

Prior to operation the system must be balanced. To do this, pickup 1 is manually positioned over edge 17 and potentiometer 19 is adjusted until the D.C. reference voltage equals the R.F. voltage induced in pickup 1. At this point the servosystem's error signal is reduced to zero and the pickup remains over edge 17. After the voltages are balanced, the servosystem is turned on and A.C. power source 21 supplies voltage of a predetermined frequency to motor coil 23 and to comparator 3. Record transport 15 is actuated and conductive body 9 is moved in the direction indicated causing edge 17 to temporarily move from under pickup 1. FIGURE 2 shows a cross section of pickup 1 and body 9 in three representative positions and relative amounts of R.F. voltage induced at each position. Regardless of the pickup's position, the induced R.F. voltage is rectified and applied to the sampling circuit within comparator 3, FIGURE 1. As shown in the same figure, D.C. reference voltage from line 13 is also applied to the comparator's sampling circuit. This circuit continuously samples segments of the rectified R.F. voltage and the reference voltage at a frequency determined by voltage source 21 which supplies power to the sampling circuit. The output voltage appearing on line 25 is a combination of the sampled voltage segments and appears as an amplitude varying signal either in phase with the voltage driving the sampling circuit or 180° out of phase with this voltage. This error or correction signal appearing at 25 is applied to servo amplifier 27 where it is amplified and applied to winding 29. Depending on the direction of the windings, conventional synchronous motor 31 moves in a given direction if the voltage appearing at 29 is in phase with the voltage appearing at 23 and in the opposite direction if the voltage at 29 is 180° out of phase with the voltage appearing at 23. Acting in accordance with this error signal, synchronous motor 31 attached to pickup moving system 33 repositions pickup 1 over edge 17. Pickup moving system 33 and potentiometer means 37, adapted to produce an output voltage that is a function of 17, are conventional and are not part of the invention. As pointed out above, any conventional closed loop servosystem can be used with the invention as shown in FIGURE 1. The preferred conventional servosystem includes a Kearfott Servo Motor 31, a conventional phase network 38 between power source 21 and a comparator 3 and a conventional control phase servo amplifier 27 between comparator 3 and windings 29. The conventional phase network serves to compensate for phase shift between A.C. power source 21 and comparator system 3 by compensating for distributed reactive components in a conventional manner. The conventional control phase servo amplifier provides the necessary power to control winding 29.

Refer now to FIGURE 2 showing representative positions of pickup 1 with respect to conductive body 9 and curve 39 showing the voltage induced at each position. Pickup 1, shown in cross section, includes outer conductor or ring 41 and center plate or wire 43. The center wire is insulated from 41 by a dielectric 45, such as neoprene, polystyrene, etc. Distance between 43 and 41 is shown as $d_1$ and the distance between 41 and 9 is shown as $d_2$. Pickup 1 can be made by using the end of a coaxial cable or a shielded wire of the desired dimensions. Conductor 41 is grounded as shown. It is desirable to modify the cable or wire by positioning a metal ring around insulation 45 and soldering it to the grounded conductor of the cable or wire.. Wire 43 serves as one plate of the capacitor and the portion of conductive element 9 underlying pickup 1 serves as the other plate of the capacitor. Slope of curve 39 is determined by the amount of voltage induced in pickup 1 at each of its representative positions. As will be shown hereinafter, the amount of induced voltage is dependent on pickup 1's dimensions and its distance from 9. The area of proportional control which determines speed of response and the amount of servohunt is shown as 47 and is dependent on the slope of curve 39. The use of capacitive pickups per se is old; however, for reasons detailed hereinafter, it is believed that pickup 1 together with comparator 3 and R.F.-D.C. source 7, FIGURE 1, are used in a novel manner to produce an improved method of developing an error signal.

The operation of the pickup itself is in accordance with the well known formula governing capacitors:

$$Q=CE$$

where Q is magnitude of the charge on each plate, C is the capacitance of the over-all pickup and E is the difference of potential betwen the two plates. When applied to the configuration of pickup 1, C equals the area of the two plates over distance between the plates times K (dielectric constant) times $K_1$ (dimension constant). Therefore, the voltage induced in pickup 1 equals the area of the end of wire 41 plus the area of 9 under pickup 1 divided by $d_2$ times 1 (dielectric constant of air) times the dimension constant desired.

From the formula above it is clear that $d_1$ and $d_2$ are variables that influence the amount of voltage induced in the pickup. Either or both of these variables may be used to change the system's area of proportional control. From FIGURE 2 it is clear that the slope of curve 39 determines the area of proportional control and that by decreasing $d_1$, or increasing $d_2$, or both, the amount of voltage induced in 1 is decreased, the slope of 39 is decreased and the area of proportional control 47 is increased. Therefore, the amount of hunting, the speed of response and the lightness of control can be changed to suit the operator's needs by simply adjusting $d_1$, $d_2$, or both.

Curve 39, FIGURE 2, also shows that the novel use of pickup 1 in combination with comparator 3 and source 7, FIGURE 1, produces a system with maximum positive control. In the event the pickup is displaced to the left of edge 17, after the system has been balanced, a voltage greater than the D.C. reference voltage is induced in the pickup and if it is displaced to the right of edge 17 a voltage less than the reference voltage is induced in the pickup. If the pickup is accidentally moved an excessive distance to the right or the left of edge 17 the system will reposition it over the edge. This advantage of maximum positive control or the ability to return the pickup to its proper position regardless of the amount of displacement is believed to be unique in inductive type pickup systems.

To better appreciate the novel structure and method of using the induced voltages to develop the proper direction and amount of pickup movement refer to FIGURES 3 and 4.

FIGURE 3 shows the preferred embodiment of comparator 3, FIGURE 1. Pickup 1, FIGURE 1, is connected through shielded cable 5 to the input of emitter follower stages 49, FIGURE 3. The emitter followers serve as impedance matching stages with a very high input impedance to isolate the R.F. energy source 7 from the succeeding stages. The output of 49 is connected to R.F. amplifier 51 which acts as a high gain voltage amplifier stabilized by a negative feedback loop. Amplifier 51 is connected to rectifier means 53 which is connected to phase shift network 55. The phase shift network acts in a conventional manner to speed up servo reponse and stop hunting. The output from 55 is connected to pole 57 of chopper 59. D.C. reference voltage from R.F.-D.C. voltage source 7, FIGURE 1, is connected to pole 61 of chopper 59 by line 13. Chopper 59 is driven by A.C. power source 21, FIGURE 1. The preferred resistor and capacitor sizes are shown in FIGURE 3. Although chopper 59 is the preferred means for sampling the two voltages described, other well-known devices such as a motor-driven synchronous switch or a switching diode can be substituted for the chopper by one skilled in the art.

Refer now to FIGURE 4 showing the preferred embodiment of R.F.-D.C. voltage source 7, FIGURE 1. This circuit includes a modified Hartley oscillator 63, which is powered by 24 volt D.C. power source 65 and various rectifier and filter components. Oscillator 63 is designed for stable operation and includes a compensating circuit to stabilize the oscillator output to be described hereinafter. The output voltage of 63 is coupled by transformer 66 to R.F. voltage output 67 which is connected to conductive curve 9, FIGURE 1, by shielded cable 11. A portion of the R.F. output is passed through D.C. isolation capacitor 69, after which it is half-way rectified by diode 71 and filtered by resistor 73 and capacitor 75. The resulting D.C. reference voltage is sent by conductor 13 through potentiometer 19 to pole 61 of chopper 59, FIGURE 3.

Let us now consider the detailed operation of the preferred embodiment of the curve follower. R.F.-D.C. voltage source 7, FIGURE 1, is actuated to supply a predetermined R.F. voltage level through shielded cable 11 to conductive body 9 and a D.C. voltage level through line 13 to comparator 3. As described heretofore, the D.C. reference level voltage is balanced by 19 to equal the induced R.F. voltage when pickup 1 is positioned over edge 17. R.F.-D.C. voltage source 7, FIGURE 4, receives its power from a minus 24 volt D.C. supply 65. The voltage is applied to modified Hartley oscillator 63 through the center tap of the primary winding of transformer 66. The un-numbered components in 63 make up the oscillator portion while 77, 79 and 81 act as the stabilizing circuit. Transistor 77, capacitor 79 and resistor 81 act in a conventional manner to stabilize the oscillator output as an active element in the emitter base feedback circuit in the oscillator circuit. The oscillator output is taken from the secondary winding of transformer 66 by output 67. The stabilized R.F. voltage appearing at 67 passes through shielded cable 11 to conductive body 9 and from there to comparator 3, FIGURE 1, as will be detailed hereinafter. A portion of the R.F. voltage appearing at 67 passes through blocking condenser 69, half-wave rectifier 71, R.F. filter containing resistor 73 and capacitor 75 and onto conductor 13. This D.C.

reference voltage appearing on 13 is applied to pole 61 of chopper 59, FIGURE 3. It should be noted that this method of obtaining the D.C. reference voltage and the R.F. voltage from common source 67 insures that small fluctuations in the R.F. voltage will not upset the R.F.-D.C. balance described heretofore. The position of potentiometer 19, FIGURES 1 and 3, which is used to produce the D.C.-R.F. balance, is not important as long as it can vary the D.C. voltage level to equal the induced R.F. voltage as described. The next step involves the actuation of servo amplifier 27 and transport 15, FIGURE 1. Assuming that the actuation of 15 causes edge 17 to move to the left of the pickup it can be seen from FIGURE 2 that the amount of induced R.F. voltage is reduced. This modified induced R.F. voltage is transmitted through cable 5, FIGURE 1, to the input of emitter follower stages 49, FIGURE 4. The voltage is then amplified by compensated linear R.F. amplifier 51 and rectified by 53. The resulting rectified R.F. voltage level is passed through phase shift network 55 to speed up response and prevent hunting and applied to pole 57 of chopper 59. A.C. power source 21, FIGURE 1, supplies chopper 59, FIGURE 3, with 6.3 volts and causes reed 83 to sample the R.F. voltage on pole 57 and the D.C. voltage on pole 61 at 400 c.p.s.

For purposes of illustrating how the curve following system achieves maximum positive control, let us assume that when the system was balanced prior to operation, the D.C. reference voltage was adjusted to a minus 3 volts. Therefore, during operation a D.C. voltage of minus 3 volts appears at pole 61. As edge 17 moves to the left of pickup 1, as shown in FIGURE 2, assume that the voltage induced in pickup 1 is reduced to minus 2 volts. Thus, the rectified R.F. voltage appearing at pole 57 is minus 2 volts. Chopper reed 83 is driven at 400 cycles per second by voltage source 21. When reed 83 contacts pole 61, minus 3 volts is applied to output 25. When reed 83 contacts pole 57, minus 2 volts is applied to output 25. Therefore, chopper 59 alternately samples the two voltages to produce an A.C. voltage varying from minus 3 volts to minus 2 volts. This A.C. error voltage is applied to servo amplifier 27, FIGURE 1, where it is amplified and applied to winding 29. A.C. power source 21 simultaneously applies a 400 cycle signal to winding 23, which is in phase with the 400 cycle signal driving chopper 59. The direction of windings 23 and 29 are arranged so that synchronous motor 29 is driven in the direction to cause pickup moving means 33 to reposition pickup 1 over edge 17. Thus when the error signal is in phase with the signal driving the chopper the pickup is moved in one direction and when it is 180 degrees out of phase the pickup is moved in the opposite direction. The amount of movement in either direction is determined by the voltage difference between the D.C. reference voltage and the rectified R.F. voltage. When pickup 1 has been repositioned over edge 17, the amount of R.F. voltage induced in 1 again equals the D.C. reference voltage and a zero level error signal is produced. Since an error voltage appearing at 25, FIGURE 1, must be either in phase or 180° out of phase with the reference voltage, the direction of windings 23 and 29 can be arranged to cause the error signal to move the pickup toward edge 17 regardless of the direction of displacement. The use of conductive body 9, FIGURE 1, causes the proper error signal to be generated regardless of the amount of displacement. Therefore, it is clear that maximum positive control is maintained regardless of the amount and direction of displacement. Of course, if a conductive strip or tape is substituted for the conductive body 9 shown in FIGURE 1, the system would lose the advantage of maximum positive control but would retain the other advantages inherent in the improved system as discussed above.

While particular modifications have been described herein, further modifications and substitutions of equivalents will be obvious to one skilled in the art and, therefore, the invention is only limited by the scope of the claims set forth hereinafter.

We claim:
1. An improved curve-following system adapted to follow one edge of a conductive element defining such curve, comprising:
   (a) a dielectric support;
   (b) a conductive element having one edge formed to define said curve, mounted on said dielectric support and forming one plate of a capacitor;
   (c) an R.F. voltage source connected to said conductive element;
   (d) a conductive probe positioned above said edge of said conductive element and electrostatically coupled to said conductive element to form the other plate of said capacitor;
   (e) a rectifier means connected to the output of said probe and adapted to convert the R.F. voltage induced in said probe to a D.C. voltage;
   (f) an adjustable D.C. voltage source adapted to be adjusted to an amplitude related to the output of said probe;
   (g) a voltage comparator connected to the output of said D.C. voltage source and to the output of said rectifier means and adapted to produce a differential voltage proportional to the difference between said outputs of said D.C. voltage source and said rectifier means and having a characteristic indicating when said differential voltage is above and when said differential voltage is below said output of said D.C. voltage source; and
   (h) means for moving said probe in response to the output of said comparator means to move said pickup means a distance proportional to the amplitude of said differential voltage and in a direction dictated by the characteristic of said differential voltage.

2. A system in accordance with claim 1 wherein the output of said rectifier means and the output of said D.C. voltage source are repetitively sampled.

3. A system in accordance with claim 2 wherein the device for repetitively sampling the voltages is a chopper having the output of the rectifier means connected to one contact, the output of the D.C. voltage source connected to the other contact and a source of high-frequency A.C. voltage applied to the moving element of said chopper.

4. A system in accordance with claim 3 wherein the output of the chopper is an amplitude varying signal whose characteristic is in phase with the A.C. voltage when the output of the rectifier means is on one side of the output of the D. C. voltage source and is 180° out of phase with said A.C. voltage when the output of said rectifier means is on the opposite side of the output of said D.C. voltage source.

5. A system in accordance with claim 1 wherein the D.C. voltage source is connected to the R.F. voltage source and includes a second rectifier means for rectifying the output of said R.F. voltage source to produce voltage for said D.C. voltage source.

6. A system in accordance with claim 1 wherein the means for moving the probe is a servomechanism.

7. A system in accordance with claim 6 wherein the servomechanism is a closed-loop system.

8. A system in accordance with claim 1 wherein the D.C. voltage source includes an adjustable potentiometer.

9. A system in accordance with claim 1 wherein the probe is a single, capacitive probe.

10. A system in accordance with claim 9 wherein the single, capacitive probe is a central conductor surrounded by a second conductor.

11. A method of following a curve defined on a dielectric support by one edge of an electrically conductive element comprising:
    (a) applying an R.F. potential to said conductive element;
    (b) placing a conductive probe electrostatically coupled to said conductive element over said edge thereof such that said conductive probe and said conductive element form separate plates of a capacitor;
    (c) moving said dielectric support relative to said conductive probe;
    (d) converting the R.F. voltage induced in said conductive probe to a D.C. voltage;
    (e) comparing the D.C. voltage derived from said conductive probe with a D.C. reference voltage to produce a differential voltage proportional to the difference of said D.C. voltages and having a characteristic indicating when said differential voltage is above and when said differential voltage is below said reference voltage; and
    (f) moving said conductive probe normal to the movement of said dielectric support a distance proportional to the magnitude of said differential voltage and in a direction indicated by said characteristic thereof.

12. A system in accordance with claim 11 wherein, prior to step (e), said D.C. reference voltage is adjusted to an amplitude related to said D.C. voltage derived from said conductive probe when one portion of said probe overlaps said conductive element and a second portion thereof overlaps said dielectric support adjacent said edge of said element.

13. A system in accordance with claim 12 wherein said D.C. reference voltage and said D.C. voltage derived from said conductive probe are repetitively compared to produce said differential voltage.

14. A system in accordance with claim 13 wherein the characteristic referred to in steps (e) and (f) is based on the phase relationship of said differential voltage to the frequency at which said D.C. voltages are compared.

References Cited by the Examiner

UNITED STATES PATENTS

| | | | |
|---|---|---|---|
| 2,611,115 | 9/52 | Johnston | 318—31 |
| 2,679,622 | 5/54 | Deri | 318—31 |
| 2,929,019 | 3/60 | Bryan et al. | 318—31 |
| 2,946,939 | 7/60 | Lind | 318—31 |
| 3,013,730 | 12/61 | Coogan | 318—162 |
| 3,021,463 | 2/62 | Haldermann | 318—31 |
| 3,060,332 | 10/62 | Anderson | 318—162 |

JOHN F. COUCH, *Primary Examiner.*